US005630119A

United States Patent [19]
Aristides et al.

[11] Patent Number: 5,630,119
[45] Date of Patent: May 13, 1997

[54] SYSTEM AND METHOD FOR DISPLAYING PROGRAM LISTINGS IN AN INTERACTIVE ELECTRONIC PROGRAM GUIDE

[75] Inventors: Phivos C. Aristides, Seattle; Brian D. Crites, Redmond; Robert M. Hohman, Renton; Frank A. Lawler, Seattle, all of Wash.

[73] Assignee: Microsoft Corporation, Redmond, Wash.

[21] Appl. No.: 435,988

[22] Filed: May 5, 1995

[51] Int. Cl.⁶ .................................................. G06F 17/30
[52] U.S. Cl. .................................. 395/601; 348/7; 348/13; 348/906
[58] Field of Search ................................ 348/2–13, 906; 395/600, 601

[56] References Cited

U.S. PATENT DOCUMENTS

| | | | |
|---|---|---|---|
| 4,751,578 | 6/1988 | Reiter et al. | 348/564 |
| 5,396,622 | 3/1995 | Lee et al. | 395/600 |
| 5,404,488 | 4/1995 | Kerrigan et al. | 395/425 |
| 5,440,730 | 8/1995 | Elmasri et al. | 395/600 |
| 5,440,732 | 8/1995 | Lomet et al. | 395/600 |
| 5,473,609 | 12/1995 | Chaney | 370/94.1 |
| 5,515,106 | 5/1996 | Chaney et al. | 348/461 |
| 5,532,754 | 7/1996 | Young et al. | 348/569 |
| 5,541,738 | 7/1996 | Mankovitz | 358/335 |
| 5,559,548 | 9/1996 | Davis et al. | 348/6 |
| 5,579,055 | 11/1996 | Hamilton et al. | 348/476 |

OTHER PUBLICATIONS

"Gemstar to Launch On–Screen Guide Early Next Year," Television Digest, vol. 35, No. 21 (May 22, 1995), pp. 10–11.

Primary Examiner—Thomas G. Black
Assistant Examiner—Maria N. Von Buhr
Attorney, Agent, or Firm—Lee & Hayes, PLLC

[57] ABSTRACT

Disclosed herein is an interactive entertainment distribution network including a headend which is connected to provide programs to a plurality of user interface units in individual homes. The user interface units are configured to run electronic program guides for displaying available programs categorized by discrete time slots. Each of the programs has a scheduled time period which occupies at least a portion of one or more of the discrete time slots. The headend maintains a database with a plurality of program data records. Each program data record is indexed by one of a plurality of bucket numbers. The bucket numbers correspond respectively to the plurality of discrete time slots. Each particular program is represented by a program data record and associated bucket number for each of the one or more discrete time slots which the program occupies. The electronic program guide requests programming information from the headend by specifying one or more bucket numbers to the headend.

15 Claims, 4 Drawing Sheets

| BUCKET NUMBER | TITLE | START | END |
|---|---|---|---|
| 335 | PROGRAM B | 3:05 | 3:30 |
| 335 | PROGRAM A | 3:15 | 4:15 |
| 336 | PROGRAM A | 3:15 | 4:15 |
| 337 | PROGRAM A | 3:15 | 4:15 |

| BUCKET | TIMESLOT START |
|---|---|
| 1 | 12:00 AM |
| 2 | 12:30 AM |
| 3 | 1:00 AM |
| 4 | 1:30 AM |
| 5 | 2:00 AM |

SYSTEM AND METHOD FOR DISPLAYING PROGRAM LISTINGS IN AN INTERACTIVE ELECTRONIC PROGRAM GUIDE

TECHNICAL FIELD

This invention relates to interactive entertainment distribution systems and to electronic program guides which operate in conjunction with such entertainment distribution systems.

BACKGROUND OF THE INVENTION

Cable TV systems often include a channel dedicated to displaying listings of programs available on the different available channels. The listings are commonly arranged in a grid. Each column of the grid represents a particular time slot, such as 4:00 p.m. to 4:30 p.m. Each row represents a particular broadcast or cable channel, such as ABC, PBS, or ESPN. The various scheduled programs or shows are arranged within the rows and columns, indicating the channels and times at which they can be found. The grid is continuously scrolled vertically so that a viewer can scan a number of different channels within three or four time slots.

Data regarding available programs is typically received by a cable system as a plurality of data records. Each available program has a single corresponding data record indicating a variety of information about the program such as its channel, its starting and ending times, its title, names of starring actors, whether closed-captioning and stereo are available, and perhaps a brief description of the program. It is not difficult to format a grid such as described above from this type of data records. The grid is typically formatted once at the cable system's headend and broadcast repeatedly and continuously to the thousands of homes served by the cable system.

Newer, interactive cable distribution systems feature electronic program guides (EPGs) which result in a functionality somewhat similar to the broadcast program listing channels described above. Rather than scrolling automatically, however, an EPG allows a viewer to use a remote control device to scroll as desired both horizontally and vertically through a program grid. This functionality utilizes the two-way communications capabilities of interactive cable systems.

An EPG runs on a user interface device, also referred to as a set-top box (STB), connected in a viewer's home between a TV and a cable system home entry line. When scrolling to a new column or row, the set-top box requests new information from the cable system's headend regarding the programming information which needs to be presented for the new row or column. For instance, when scrolling to a new column, programs falling within a new time slot need to be displayed. The STB requests new information from the cable headend regarding programs available on the displayed channels falling within the new time slot.

The cable headend must be able to process such requests very quickly so that the viewer sees no significant delay. However, determining which data records refer to programs occupying a given time slot is not a trivial task. Even though data records might be arranged chronologically by starting times, it is not sufficient just to search for those records having starting times matching the starting time of the time slot. For example, when using half-hour time slots many programs align perfectly along time slot boundaries. A show starting at 4:00 p.m. and ending at 4:30 p.m. would align perfectly with the 4:00 p.m. to 4:30 p.m. time slot. Other shows, however, might start before the time slot or end after the time slot. Still other shows might begin and end completely within the time slot. Generally, it can only be said that each program will correspond to a scheduled time period and that the scheduled time period of an individual program will occupy at least a portion of one or more of the discrete time slots.

Accordingly, it is necessary to assume a maximum program duration, calculate the earliest possible time a program of the maximum duration might have started while still ending after the start time of the time slot, and then examine all data records representing programs starting between that earliest possible time and the ending time of the time slot. In light of the fact that the maximum program duration might be eight hours or more, such a search involves a great number of records. Furthermore, it must be carried out quite often for every subscriber connected to the cable headend using an EPG. In a typical system, 50,000 to over 250,000 viewers might be connected to a headend. It is apparent that the present configuration and search strategies described above are not satisfactory for a demand of this magnitude.

SUMMARY OF THE INVENTION

The preferred embodiment of the invention creates one or more database records at the headend for each program. Particularly, for a given program there is a database record corresponding to each time slot which is at least partially occupied by the program. For example, a program running from 3:15 to 3:45 would have database records corresponding to a 3:00–3:30 time slot and a 3:30–4:00 time slot. Each possible time slot is assigned its own bucket number. The records are then arranged and indexed by bucket number rather than by the starting time of the referenced program. An EPG requests records by bucket number, allowing very quick retrieval by the database server. The EPG optionally maintains a record cache to minimize the number of requests to the database server.

DETAILED DESCRIPTION OF THE PREFERRED EMBODIMENT

Figure 1:
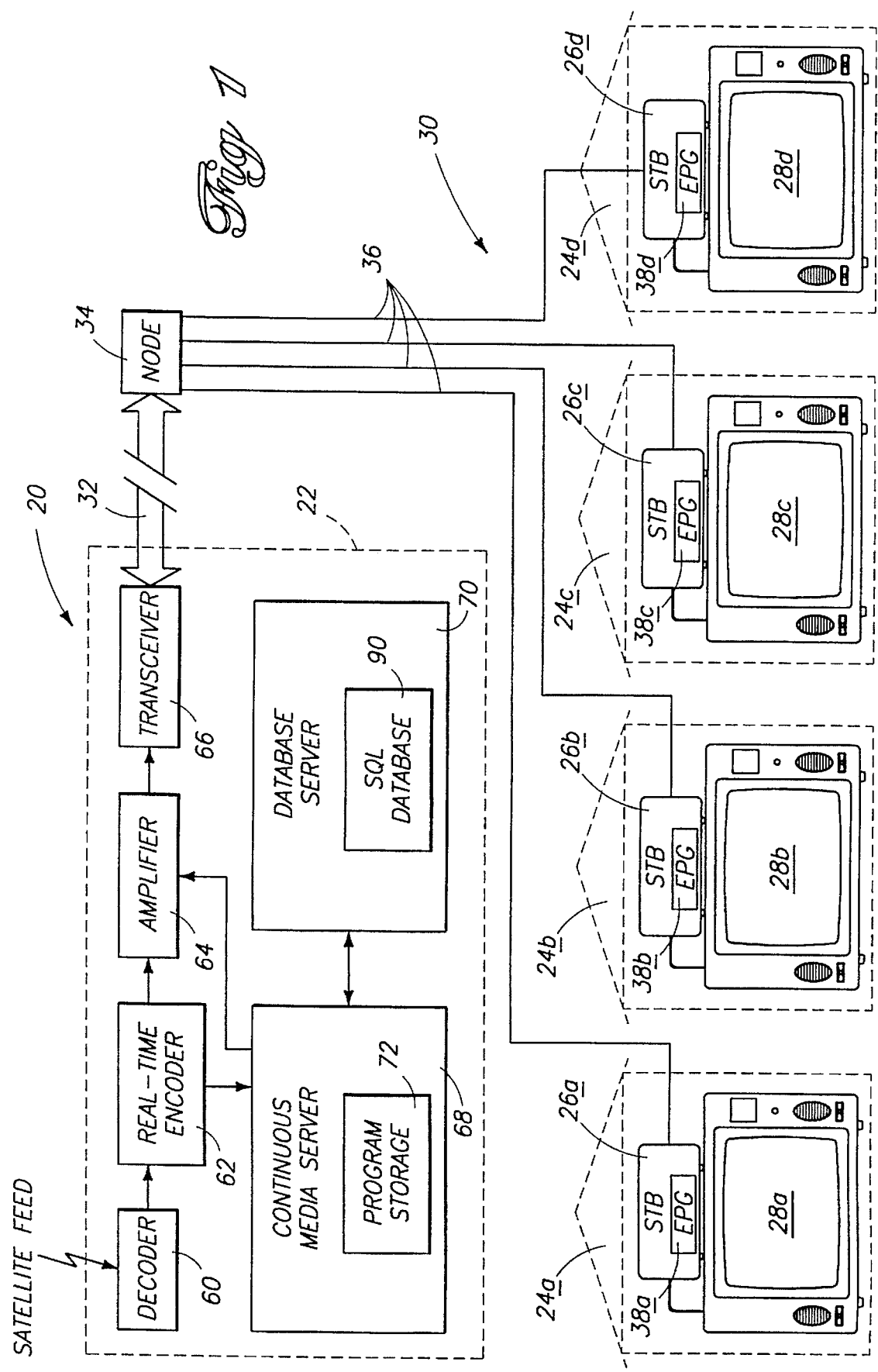
FIG. 1 is a block diagram of a interactive cable distribution network according to this invention.

FIG. 1 shows an example of an interactive entertainment distribution network, generally referenced by the numeral 20. Network 20 includes a centralized headend or headend server 22 which is configured to provide programs to multiple individual homes. Representative homes 24a–24d are shown. Programs provided by headend 22 might include traditional broadcast TV shows, pay-per-view movies, and other services such as those commonly provided in the past by online computer services.

A single headend might service 250,000 or more homes. Each home has a user interface unit 26a–26d, commonly referred to as a set-top box (STB), coupled to a television set or video display device 28a–28d. The user interface units receive video signals from headend 22 and control which programs are displayed on the associated TVs. A user interface unit could be incorporated in the TV if desired.

Headend 22 is interconnected to the subscribers' homes 24a–24d via a multi-tier distribution structure 30. Distribution structure 30 includes a highspeed, high-bandwidth fiber optic cable network 32 coupled to regional distribution nodes (represented by distribution node 34). The speed and bandwidth of the fiber optic cable affords the desired performance for supporting a fully interactive system. Each distribution node 34 is connected to multiple user interface units 26a–26d via conventional home entry lines 36, such as twisted-pair lines or coaxial cable. As an example, each distribution node 34 supports approximately 1200 homes.

Headend 22 provides the multiple different programs to the user interface unit and EPG within each home. The programs are embodied as video data streams that are transmitted from headend 22 over distribution structure 30 to homes 24a–24d. The headend receives the video signals from another source, such as a satellite feed or other cable system. The video signals are first decoded by decoder 60 to extract the video information. The extracted video information is then reconfigured into the appropriate video data stream by real-time encoder 62. The real-time video data stream is transferred to an amplifier 64 and transmitted by transceiver 66 over distribution structure 30 to homes 24a–24d.

Headend 22 also includes a continuous media server 68 containing video data streams, such as feature-length movies or past TV shows, from a plurality of different sources. Media server 68 might also store movie preview clips, audio programs, and other continuous data streams. A potential viewer can select any one of these data streams for viewing at any time.

Each user interface unit 26a–26d is configured to run an electronic program guide (EPG) 38a–38d. An electronic program guide provides an on-screen listing of various programs or program titles categorized by discrete time slots. The listing is organized in a predetermined arrangement that is displayed on the television. The EPG might also include other program descriptive information, including whether the program is provided in closed caption or stereo.

Figure 2:
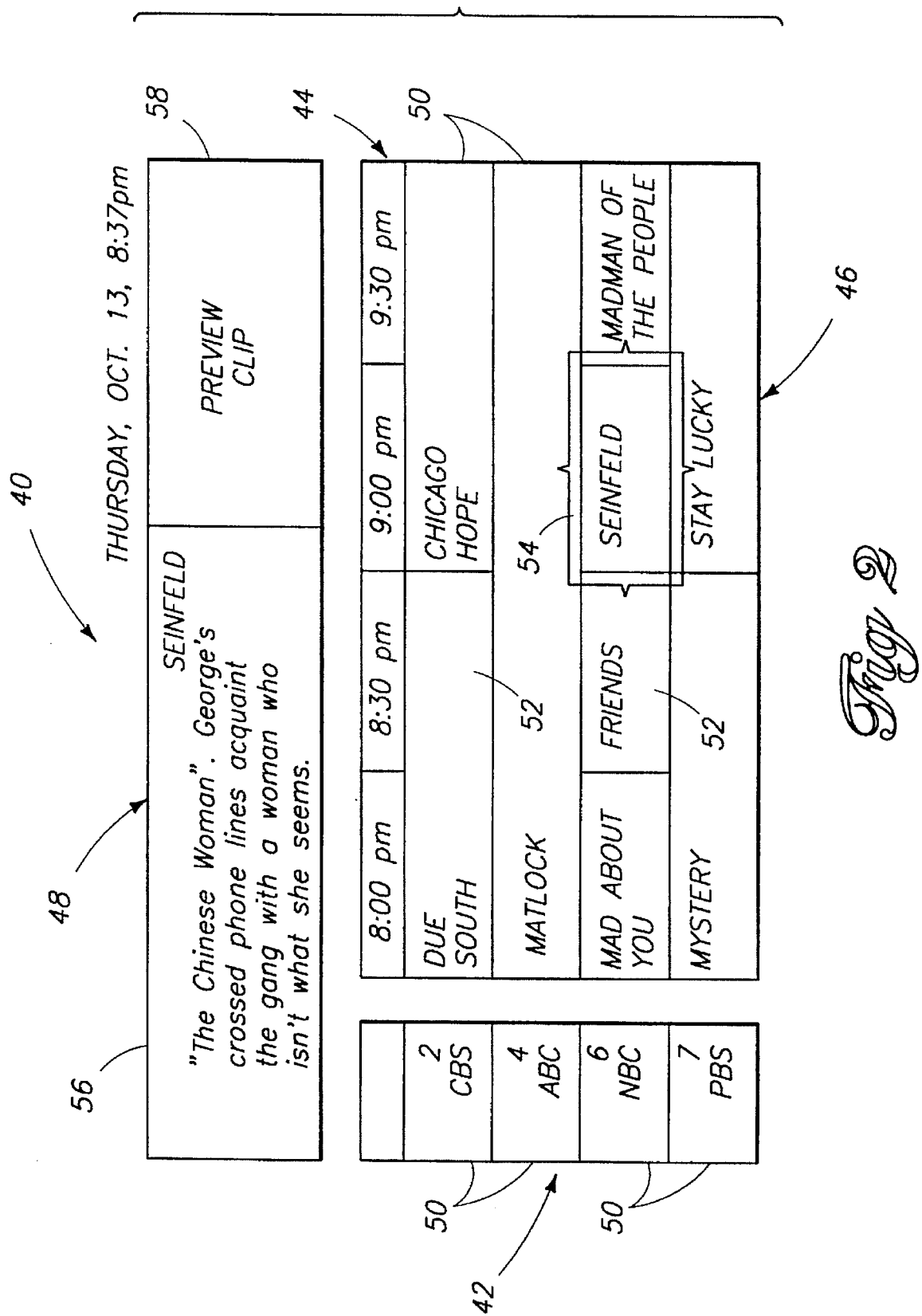
FIG. 2 is an exemplary screen illustration of an electronic programming guide.

FIG. 2 shows an example screen display 40 of an EPG. The EPG screen display 40 includes a channel panel 42, a time panel 44, a program grid 46, and a program summary panel 48. Channel panel 42 provides a vertical scrolling list which displays four channel tiles 50 at any one time. Each channel tile 50 includes a channel number an a channel name (typically the network name, such as CBS and ABC), and might also include a channel logo. The channel panel 42 defines four rows of program titles in program grid 46. Time panel 44 is a horizontal scrolling list of half-hour time segments or slots. Time panel 44 defines columns in program grid 46.

Program grid 46 consists of multiple program tiles 52 organized in channel-based rows and time-based columns. It is located to the right of the channel panel 42 and below the time panel 44. Each program tile 52 has the program title and any secondary program descriptive information, such as closed caption, stereo, etc. The illustrated screen shows an example programming line-up for 8:00 p.m. to 10:00 p.m. PST, Thursday, Oct. 13, 1994. The program titles, such as "Due South" and Matlock," are arranged horizontally with their respective networks CBS and ABC and vertically with respect to their start times of 8:00 p.m. PST.

The viewer controls the program selection with a single focus frame 54 which is graphically overlaid on the program grid 46. Focus frame 54 can be moved up or down within a time slot, or left and right within a channel line-up, to choose a desired program. A remote control handset, a touch control panel on the set-top box, or other manipulating mechanism can be used to position the focus frame 54.

Program summary panel 48 includes a text description window 56 and a preview window 58. The text description window 56 displays program information related to the program that is highlighted by the focus frame 54 in program grid 46. Here, the NBC program "Seinfeld" is highlighted. The text description of window 56 lists the program title "Seinfeld," and a program description of the current episode. The text description window 56 might also include other program related information like closed-captioning, stereo, etc. The preview window 58 is used to display clips of the selected highlighted show.

The EPG has other on-screen display formats. For instance, the EPG might group program titles according to their content, such as sports or dramas. The EPG can also be configured to use techniques other than, or in addition to, scrolling to locate the desired program title. One example technique is to provide for key word searching that allows the viewer to identify a particular show. Once identified, the EPG would immediately display the relevant program grid pertaining to that show.

Headend 22 includes a database server 70 which contains the information needed by the EPG. Database server 70 contains a Structured Query Language (SQL) database 90 with records containing information relating to available shows or programs. The SQL records reflect such things as the program title, actor information, whether the program has closed captioning or stereo audio, the scheduled time of the program, the network name, the program category, description text, and other information. The program information is used by the EPG as the viewer scrolls through the grid. For instance, the program title and scheduled program time stored in SQL database 90 are used to fill respectively the program tiles 52 of program grid 46 and the time panel 44 (FIG. 2). Each user interface unit can communicate through transceiver 66 with database server 70.

The SQL database also holds pointers to locations within the storage subsystem of continuous media server 68. The pointers identify storage locations of the video data streams of the programs that correspond to the information listed in the SQL database.

Figure 3:
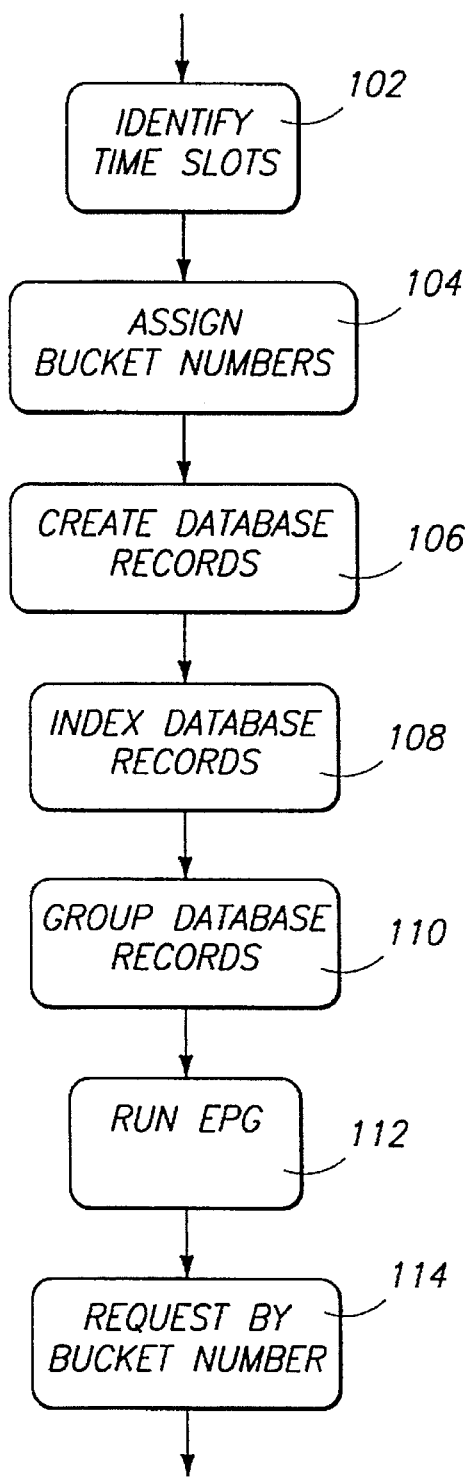
FIG. 3 is a flow chart showing preferred steps in accordance with this invention.

In order to process requests from user interface devices more quickly, database server 70 creates, organizes, indexes, and searches program data records in accordance with the general steps shown in FIG. 3. The block diagram of FIG. 3 assumes that database 70 already contains a plurality of program data records containing information about the programs provided by the headend. Each data record is indexed by one of a plurality of bucket numbers. The bucket numbers correspond respectively to a plurality of discrete time slots. A particular program is represented in the database by a program data record and associated bucket number for each of the one or more time slots which are at least partially occupied by said particular program. When requesting information about a particular time slot, an EPG specifies the corresponding bucket number to the headend.

A first step 102 in FIG. 3 comprises identifying a plurality of discrete time slots that will be displayed by the EPG. For example, it is common to display program listings in half-hour time slots as illustrated in FIG. 2. The various programs available from headend 22 have scheduled time periods which may or may not correspond directly to one of the identified time slots. Generally, however, the scheduled time period of an individual program will occupy at least a portion of one or more of the discrete time slots.

A step 104 comprises assigning a unique bucket number to each time slot. For example, a four week line-up would contain 1344 (24×2)×(7×4) half-hour time slots which would be numbered 1 through 1344. Step 106 comprises creating program data records on a storage medium in database server 70 corresponding to the programs provided by the headend. For a particular program, a separate record is created corresponding to each of the one or more time slots which are at least partially occupied by said particular program. As an example, a program starting at 3:15 and running until 4:15 would have three corresponding data records: one for each of the 3:00–3:30, 3:30–4:00, and 4:00–4:30 time slots. A step 108 comprises indexing the individual program data records on the storage medium by the bucket numbers assigned to the time slots represented by the program data records.

Figures 4, 5, 6:
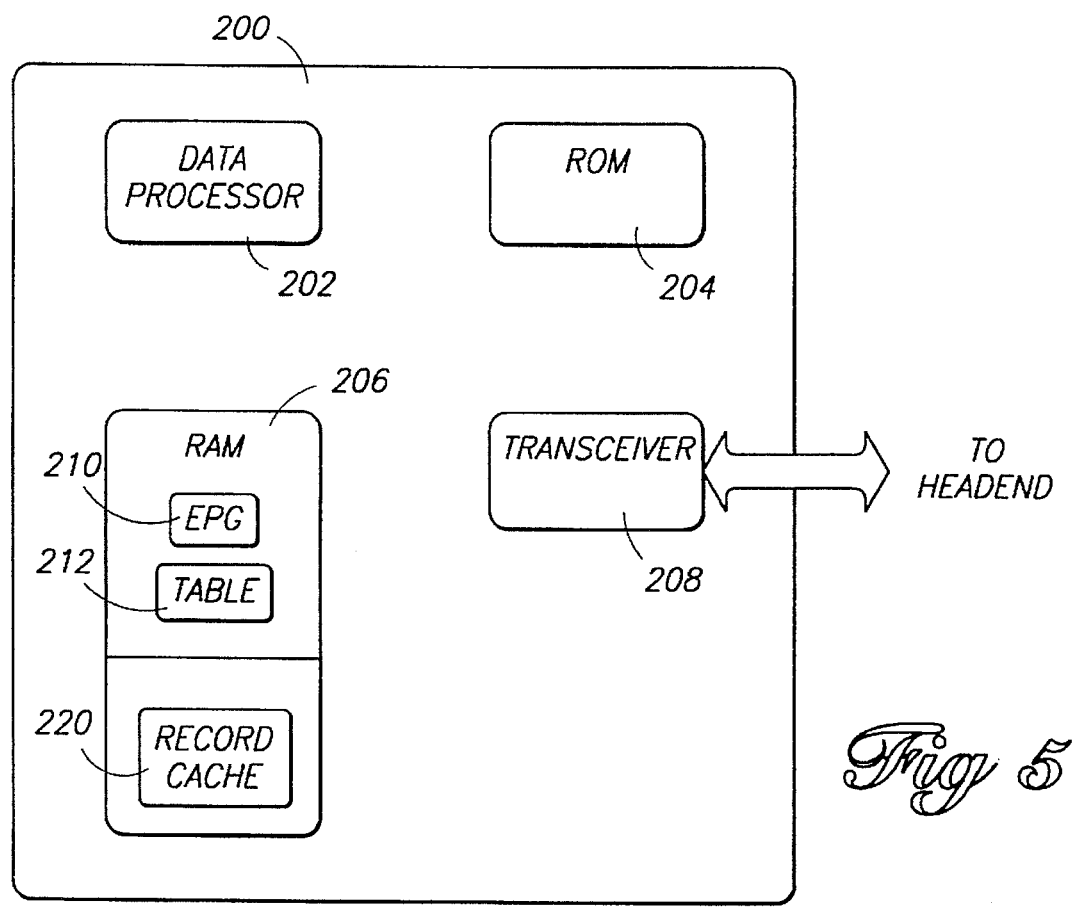
FIG. 4 is a simplified example of database records in accordance with the invention, organized by bucket numbers.
FIG. 5 is a block diagram of a user interface unit in accordance with a preferred embodiment of the invention.
FIG. 6 is a simplified example of a bucket/time slot table in accordance with the invention.

A hypothetical example of the program data records for two programs, resulting from the above steps, is shown in FIG. 4. Program A starts at 3:15 and runs until 4:15. Program B starts at 3:05 and runs until 3:30. As illustrated, Program A has three corresponding data records, identified by bucket numbers 335, 336, and 337. In this example, bucket number 335 corresponds to the 3:00–3:30 time slot; bucket number 336 corresponds to the 3:30–4:00 time slot; and bucket number 337 corresponds to the 4:00–4:30 time slot. Program B has only a single corresponding data record, indexed by bucket number 335 which corresponds to the 3:00–3:30 time slot. In addition to the bucket number, each data record has further information about the referenced program, such as title, starting and ending times, starring actors, etc.

A further step 110 in accordance with the invention comprises grouping program data records on the storage medium by bucket number. This is preferably implemented by clustering on a hard disk storage medium those program data records indexed by common bucket numbers. Such grouping or clustering facilitates quick retrieval of all records having a particular bucket number.

Step 112 comprises running an electronic program guide on a user interface unit in an individual home. The electronic program guide executes a step 114 of requesting programming information from the cable system's headend by specifying one or more bucket numbers to the headend. For example, suppose that a viewer's EPG initially shows a grid consisting of channels 5, 6, and 7, for time slots 8:00–8:30, 8:30–9:00, and 9:00–9:30. Suppose than the viewer then scrolls horizontally to display time slots 8:30–9:00, 9:00–9:30, and 9:30–10:00. In response to a request by the viewer to display a new time slot (9:30–10:00), corresponding for example to bucket number 348, the EPG issues a request or query to database 70 for any program data records having a bucket number of 348 which reference a program available on channel 5, 6, or 7. Because the data records are indexed on database 70 by bucket number, very little work is needed to locate these records.

FIG. 5 shows an user interface unit or set-top box 200 in accordance with a preferred embodiment of the invention. STB 200 includes a programmable data processor 202, non-volatile memory (ROM) 204, volatile data/program memory (RAM) 206, and communications means 208 responsive to data processor 202 for communicating with the cable headend to request and receive program data records.

An electronic program guide (EPG) 210 runs on data processor 202 from data/program memory 206. EPG 210 is an executable program which is downloaded as an object or module from the cable headend in response to instructions by a viewer. EPG 210 maintains a bucket/time slot table 212 which maps individual time slots to unique bucket numbers. This table is identical to a table stored at the headend and is obtained from the cable headend during initialization of the EPG. FIG. 6 shows an example format for table 212. Rather than maintaining such a table, in some cases it may be desirable to calculate bucket numbers as need for them arises. For instance, bucket numbers could be formulated to indicate a corresponding time slot by the year, date, and time-of-day of the time slot. This way, a bucket number for any given time slot could be derived without a lookup table. As a more specific example, the bucket number for any specific time slot could be calculated as the number of elapsed seconds from Jan. 1, 1970, to the beginning of the time slot.

EPG 210 optionally maintains a primary record cache 220 in the STB containing a set of the program data records from the headend which are most likely to be used by the electronic program guide. The grid displayed by the EPG can be thought of as a small, rectangular "display" grid which is just a portion of a much larger "overall" grid which includes all available channels and all time slots for perhaps a four week period. Record cache 220 contains records corresponding to a grid which is larger than the display grid but smaller than the overall grid. When the record cache contains records needed by the EPG, the EPG uses the records from the record cache and no requests are made to the headend. However, the EPG updates the record cache with program data records requested from the headend when the record cache does not contain a program data record needed by the electronic program guide. When requesting a program data record not in the record cache, the EPG also requests additional program data records to update the record cache with those program data records most likely to be needed in the future. All such requests are made by specifying bucket numbers. The record cache increases the efficiency of requests to the headend. Rather than making a separate request as each new record is needed, the EPG less frequently requests groups of records to update cache 220.

Further speed improvements can be obtained by implementing a secondary cache structure in headend 20. Specifically, database 70 maintains a table of records, indexed by bucket number, in electronic or randomly-addressable memory rather than disk-based memory to facilitate quick access. The table is organized identically to record cache 220, except that it is larger. It is updated as needed so that it contains the correct responses to the most frequently received queries.

The features and methodical steps described above allow a database server to respond much more quickly to EPG requests than was previously possible. Rather than having to find and examine a large number of records, the database server can almost immediately find and retrieve records identified by bucket numbers. Furthermore, the optional record cache maintained by an EPG greatly reduces the number of database requests from set-top boxes to the headend.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. In an interactive entertainment distribution network having a headend which is connected to provide programs to a plurality of user interface units in individual homes, each of the programs corresponding to a scheduled time period, an information storage system comprising:

a storage medium containing a plurality of program data records, the program data records containing information about the programs provided by the headend;

each program data record being indexed by one of a plurality of bucket numbers, the bucket numbers corresponding respectively to a plurality of discrete time slots;

wherein the scheduled time period of a particular program provided by the headend occupies at least a portion of one or more of the discrete time slots;

said particular program being represented by a program data record and associated bucket number for each of the one or more discrete time slots which are at least partially occupied by said particular program.

2. An information storage system as recited in claim 1 wherein the program data records are grouped at the headend by bucket number.

3. An information storage system as recited in claim 1 wherein program data records indexed by common bucket numbers are clustered at the headend.

4. An interactive entertainment distribution network comprising:

a plurality of user interface units in individual homes;

a headend which is connected to provide programs to the plurality of user interface units, each of the programs corresponding to a scheduled time period;

a storage medium at the headend containing a plurality of program data records, the program data records containing information about the programs provided by the headend;

each program data record being indexed by one of a plurality of bucket numbers, the bucket numbers corresponding respectively to a plurality of discrete time slots;

wherein the scheduled time period of a particular program provided by the headend occupies at least a portion of one or more of the discrete time slots;

said particular program being represented by a program data record and associated bucket number for each of the one or more discrete time slots which are at least partially occupied by said particular program;

an electronic program guide which executes on a user interface unit, wherein the electronic program guide displays programming information categorized by the discrete time slots and wherein the electronic program guide requests programming information from the headend by specifying one or more bucket numbers to the headend.

5. An interactive entertainment distribution network as recited in claim 4 wherein the program data records are physically grouped at the headend by bucket number.

6. An interactive entertainment distribution network as recited in claim 4 wherein program data records indexed by common bucket numbers are clustered at the headend.

7. An interactive entertainment distribution network as recited in claim 4 and further comprising a record cache in the user interface unit containing a set of the program data records from the headend which are most likely to be used by the electronic program guide.

8. An interactive entertainment distribution network as recited in claim 4 and further comprising a record cache in the user interface unit containing a set of the program data records from the headend which are most likely to be used by the electronic program guide, wherein the user interface unit updates the record cache with program data records requested from the headend when the record cache does not contain a program data record needed by the electronic program guide.

9. A user interface unit for use in an individual home for connection to an interactive entertainment distribution network headend, the headend providing programs to the user interface unit, each of the programs corresponding to a scheduled time period, the user interface unit comprising:

a data processor;

an electronic program guide which executes on the data processor to display programming information categorized by discrete time slots, wherein the scheduled time period of a particular program provided by the headend occupies at least a portion of one or more of the discrete time slots;

means responsive to the data processor for communicating with the headend to receive program data records, the program data records containing information about the programs provided by the headend;

a record cache containing a set of the program data records from the headend which are most likely to be used by the electronic program guide;

wherein the electronic program guide gets programming information from the program data records contained in the record cache;

wherein the electronic program guide updates the record cache with program data records obtained from the headend by specifying one or more bucket numbers to the headend, each bucket number corresponding to an individual discrete time slot.

10. A user interface unit as recited in claim 9 wherein the electronic program guide, upon needing a particular program data record which is not contained in the record cache, requests said particular program data record from the headend and also requests additional program data records to update the record cache with program data records most likely to be needed in the future; such requests being made by specifying bucket numbers to the headend.

11. In an interactive entertainment distribution network having a headend which is connected to provide programs to a plurality of user interface units in individual homes, each of the programs corresponding to a scheduled time period, a method of organizing programming information at the headend, the method comprising the following steps:

identifying a plurality of discrete time slots, wherein the scheduled time period of an individual program provided by the headend occupies at least a portion of one or more of the discrete time slots;

assigning a unique bucket number to each discrete time slot;

creating program data records on a storage medium corresponding to the programs provided by the headend; said program data records including, for a particular program, a separate record corresponding to each of the one or more discrete time slots which are at least partially occupied by said particular program;

indexing individual program data records on the storage medium by the bucket numbers assigned to the discrete time slots corresponding to said individual program data records.

12. A method as recited in claim 11 and further comprising grouping program data records on the storage medium by bucket number.

13. A method as recited in claim 11 and further comprising the following additional steps:

running an electronic program guide on a user interface unit;

the electronic program guide displaying programming information categorized by the time slots;

the electronic program guide requesting programming information from the headend by specifying one or more bucket numbers to the headend.

14. A method as recited in claim 11 and further comprising the following additional steps:

running an electronic program guide on a user interface unit;

the electronic program guide displaying programming information categorized by the discrete time slots;

the electronic program guide requesting programming information from the headend by specifying one or more bucket numbers to the headend;

maintaining a record cache in the user interface unit containing a set of the program data records from the headend which are most likely to be used by the electronic program guide.

15. A method as recited in claim 11 and further comprising the following additional steps:

running an electronic program guide on a user interface unit;

the electronic program guide displaying programming information categorized by the discrete time slots;

the electronic program guide requesting programming information from the headend by specifying one or more bucket numbers to the headend;

maintaining a record cache in the user interface unit containing a set of the program data records from the headend which are most likely to be used by the electronic program guide;

updating the record cache with program data records requested from the headend when the record cache does not contain a program data record needed by the electronic program guide.

* * * * *